(12) United States Patent
Hasslinger et al.

(10) Patent No.: US 12,376,604 B2
(45) Date of Patent: Aug. 5, 2025

(54) METHOD FOR PRODUCING A CONFECTIONERY PRODUCT HAVING A SUGAR-FREE COATING COVERING

(71) Applicant: SÜDZUCKER AG, Mannheim (DE)

(72) Inventors: Bernd Hasslinger, Obrigheim (DE); David Richfield, Obrigheim (DE); Roland Zsembery, Obrigheim (DE)

(73) Assignee: SÜDZUCKER AG, Mannheim (DE)

( * ) Notice: Subject to any disclaimer, the term of this patent is extended or adjusted under 35 U.S.C. 154(b) by 599 days.

(21) Appl. No.: 17/601,248

(22) PCT Filed: Apr. 1, 2020

(86) PCT No.: PCT/EP2020/059324
§ 371 (c)(1),
(2) Date: Oct. 4, 2021

(87) PCT Pub. No.: WO2020/201393
PCT Pub. Date: Oct. 8, 2020

(65) Prior Publication Data
US 2022/0174977 A1    Jun. 9, 2022

(30) Foreign Application Priority Data

Apr. 5, 2019 (DE) .......................... 102019204936.2

(51) Int. Cl.
*A23G 4/02* (2006.01)
*A23G 4/06* (2006.01)
(Continued)

(52) U.S. Cl.
CPC ............. *A23G 4/025* (2013.01); *A23G 4/062* (2013.01); *A23G 4/10* (2013.01); *A23G 4/20* (2013.01);
(Continued)

(58) Field of Classification Search
CPC .......... A23G 4/025; A23G 4/062; A23G 4/10; A23G 4/20; A23G 2200/06;
(Continued)

(56) References Cited

U.S. PATENT DOCUMENTS 3,456,050 A * 7/1969 Rieckmann ............... A23G 4/20
106/217.7
4,238,510 A * 12/1980 Cherukuri ................ A23G 3/38
426/5

(Continued)

FOREIGN PATENT DOCUMENTS

CN        101652077 A     2/2010
CN        101790322 A     7/2010
(Continued)

OTHER PUBLICATIONS

Paige et al., Palatinit® digestibility in children—ScienceDirect, Abstract, p. 1, vol. 12, Issue 1, Jan. 1992, pp. 27-37 (Year: 1992).*

(Continued)

*Primary Examiner* — Drew E Becker
*Assistant Examiner* — Luis Eugenio Diou Berdecia
(74) *Attorney, Agent, or Firm* — Carter, DeLuca & Farrell, LLP; George Likourezos

(57) ABSTRACT

Methods for the production of a confectionery product having a sugar-free coating covering include applying an isomalt-containing coating medium to at least one confectionery core to obtain a coating layer enveloping the core, sprinkling at least one powdered rice starch isomalt composition onto the coating layer core to obtain a coating film, and crystallizing the coating film. The methods include applying the isomalt-containing coating medium to the at least one coating film to obtain at least one further coating layer, sprinkling the at least one powdered rice starch isomalt composition onto the further coating layer to obtain (Continued)

Figure 1:
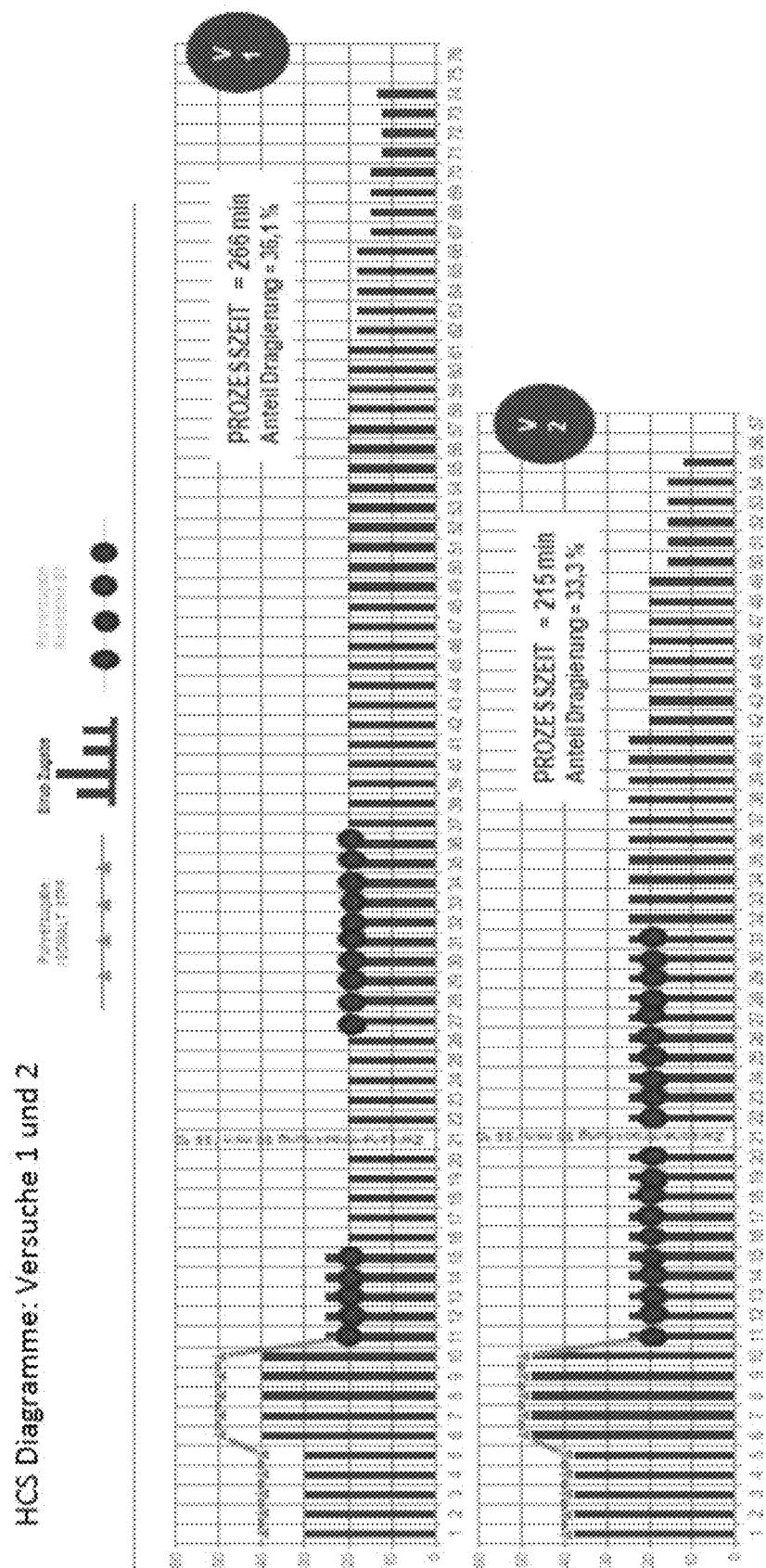

a further coating film, and crystallizing the further coating film. The method includes applying the isomalt-containing coating medium at least once to further coating film to obtain at least one further coating layer without subsequent sprinkling of the at least one powdered rice starch isomalt composition onto the coating layer.

12 Claims, 6 Drawing Sheets

(51) Int. Cl.
    *A23G 4/10*            (2006.01)
    *A23G 4/20*            (2006.01)

(52) U.S. Cl.
    CPC ...... *A23G 2200/06* (2013.01); *A23G 2220/20* (2013.01)

(58) Field of Classification Search
    CPC ...... A23G 2220/20; A23G 3/34; A23G 3/343; A23G 3/54; A23G 2200/00; A23L 29/212; A23P 20/10; A23P 20/105
    USPC ............ 426/3, 5, 293, 304, 302, 93, 48, 103
    See application file for complete search history.

(56) References Cited

U.S. PATENT DOCUMENTS

| | | | | |
|---|---|---|---|---|
| 4,317,838 A * | 3/1982 | Cherukuri | A61K 9/28 | 426/291 |
| 4,681,766 A * | 7/1987 | Huzinec | A23G 3/343 | 426/103 |
| 4,786,511 A * | 11/1988 | Huzinec | A23G 3/343 | 426/103 |
| 5,258,187 A * | 11/1993 | Shimada | A23G 4/025 | 426/74 |
| 5,536,511 A * | 7/1996 | Yatka | A23G 4/10 | 426/305 |
| 5,626,892 A * | 5/1997 | Kehoe | A23G 4/02 | 426/5 |
| 7,641,892 B2 * | 1/2010 | Gebreselassie | A61K 8/19 | 424/48 |
| 2003/0152683 A1 * | 8/2003 | Peterson | A23G 3/343 | 426/548 |
| 2004/0156993 A1 * | 8/2004 | Satomi | A23G 3/368 | 427/372.2 |
| 2004/0234648 A1 * | 11/2004 | Mazurek | A23G 4/10 | 426/3 |
| 2005/0008732 A1 * | 1/2005 | Gebreselassie | A23G 4/02 | 426/5 |
| 2005/0048164 A1 * | 3/2005 | Stahl | A23G 4/10 | 426/5 |
| 2006/0025584 A1 * | 2/2006 | Eroma | A61P 1/02 | 536/123.13 |
| 2006/0034975 A1 * | 2/2006 | Schechner | A23G 4/064 | 426/3 |
| 2006/0099308 A1 * | 5/2006 | Zuehlke | G06F 16/173 | 426/293 |
| 2006/0204614 A1 * | 9/2006 | Rapp | A23L 25/25 | 426/5 |
| 2008/0050605 A1 * | 2/2008 | Rapp | A23G 3/0085 | 427/202 |
| 2008/0063747 A1 * | 3/2008 | Boghani | A23G 4/20 | 426/534 |
| 2008/0317681 A1 * | 12/2008 | Gebreselassie | A23G 4/126 | 424/48 |
| 2009/0017159 A1 * | 1/2009 | Porsgaard | A23G 4/20 | 426/5 |
| 2009/0142443 A1 * | 6/2009 | Robinson | A23G 4/20 | 426/5 |
| 2009/0214700 A1 * | 8/2009 | Hasslinger | A23G 4/20 | 426/89 |
| 2009/0258109 A1 * | 10/2009 | Ortiz De Zarate | A23G 4/20 | 426/103 |
| 2009/0304855 A1 * | 12/2009 | Fabre | A23G 4/043 | 426/5 |
| 2010/0028521 A1 * | 2/2010 | Nieto | A23G 4/062 | 426/577 |
| 2010/0061939 A1 * | 3/2010 | Mortensen | A23G 4/068 | 424/48 |
| 2010/0104688 A1 * | 4/2010 | Andersen | A23G 4/18 | 426/5 |
| 2010/0203190 A1 * | 8/2010 | Barkalow | A23L 29/37 | 426/103 |
| 2010/0316759 A1 * | 12/2010 | Kowalczyk | A23G 4/062 | 426/103 |
| 2011/0117173 A1 * | 5/2011 | Hummeluhr | A23G 4/068 | 424/94.1 |
| 2011/0287060 A1 * | 11/2011 | Gonze | A23G 3/343 | 426/103 |
| 2013/0052307 A1 * | 2/2013 | Elejalde | A23G 1/54 | 426/291 |
| 2013/0071516 A1 * | 3/2013 | Elejalde | A23G 3/38 | 426/5 |
| 2013/0156885 A1 * | 6/2013 | Johnson | A23G 4/06 | 426/3 |
| 2013/0177669 A1 * | 7/2013 | Johnson | A23G 4/06 | 426/5 |
| 2013/0209605 A1 * | 8/2013 | Adivi | A23L 29/37 | 426/5 |
| 2013/0323377 A1 * | 12/2013 | Kowalczyk | A23G 3/54 | 426/302 |
| 2014/0314906 A1 * | 10/2014 | Verdu | A23G 3/42 | 426/5 |
| 2015/0079227 A1 * | 3/2015 | Dorr | A23G 4/025 | 536/123 |
| 2015/0272161 A1 * | 10/2015 | Johnson | A23L 27/86 | 426/5 |
| 2016/0029656 A1 * | 2/2016 | Okubo | A23G 3/42 | 426/103 |
| 2016/0192674 A1 * | 7/2016 | Perez | A23G 4/06 | 426/5 |
| 2016/0353765 A1 * | 12/2016 | Bogdan-Smigielska | A23G 3/26 | |
| 2018/0070606 A1 * | 3/2018 | Baldi | A23G 4/062 | |
| 2022/0174977 A1 * | 6/2022 | Hasslinger | A23G 4/10 | |

FOREIGN PATENT DOCUMENTS

| | | | |
|---|---|---|---|
| DE | 19549645 C2 | 12/2002 | |
| EP | 2025245 A1 | 2/2009 | |
| FR | 2464656 A1 | 3/1981 | |
| GB | 2079129 A | 1/1982 | |
| WO | 2005082154 A1 | 9/2005 | |
| WO | WO-2006007839 A1 * | 1/2006 | ............ A23G 3/343 |
| WO | 2009021613 A1 | 2/2009 | |
| WO | 2015062952 A1 | 5/2015 | |

OTHER PUBLICATIONS

International Search Report and Written Opinion issued by the European Patent Office in connection with International Application No. PCT/EP2020/059324 dated Jul. 9, 2020, together with English translation.

International Preliminary Report on Patentability and Written Opinion Issued by International Bureau of WIPO in connection with International Application No. PCT/EP2020/059324 dated Oct. 14, 2021.

* cited by examiner

METHOD FOR PRODUCING A CONFECTIONERY PRODUCT HAVING A SUGAR-FREE COATING COVERING

CROSS REFERENCE TO RELATED APPLICATIONS

The present application is a national stage application of International Application No. PCT/EP2020/059324, filed Apr. 1, 2020, which claims the benefit and priority of German Patent Application No. 102019204936.2, filed Apr. 5, 2019, the entire contents of each of which are hereby incorporated by reference herein in their entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

BACKGROUND OF THE INVENTION

Field of the Invention

The present invention relates to a method for producing a confectionery product having a sugar-free coating covering and the products obtained from this method, particularly a confectionery product having a sugar-free coating covering. Compositions using titanium dioxide as a colorant have hitherto been used predominantly to produce particularly white confectionery products. Titanium dioxide itself can, however, under certain circumstances, particularly in larger quantities, be regarded as possibly hazardous to health. A known alternative for the production of confectionery products having sugar-free coating coverings is the use of maltitol and dextrin, which, however, do not produce white confectionery products, but rather confectionery products having a yellowish color. The disadvantage of the previously known methods is that either a substance that may be hazardous to health, such as titanium dioxide, has to be used to produce confectionery products having a white color, or that sugar-free confectionery products that are insufficiently white are produced.

There is therefore a need for alternatives in order to provide confectionery products, particularly chewing gum, in a manner appealing to consumers, that is, particularly having a white color, which particularly do not contain any titanium dioxide.

The present invention is thus based on the technical problem of providing methods which allow the production of confectionery products, particularly chewing gum, having a sugar-free coating covering and which are distinguished by a white color in a way that is harmless to health.

Description of Related Art Including Information Disclosed Under 37 CFR 1.97 and 1.98

Not Applicable

BRIEF SUMMARY OF THE INVENTION

The present invention solves the underlying technical problem by providing the teachings of the independent claims.

The present invention therefore relates to a method for producing a confectionery product having a sugar-free coating covering, comprising the following method steps:

a) providing at least one confectionery core, an isomalt-containing coating medium and at least one powdered rice starch isomalt composition, wherein the at least one powdered rice starch isomalt composition has at least 30% by weight of rice starch (based on the total weight of the total dry substance of the at least one rice starch isomalt composition), b) performing an initial coating cycle comprising the following steps:
  b1) applying the isomalt-containing coating medium to the at least one confectionery core to obtain a coating layer enveloping the core and
  b2) sprinkling the at least one powdered rice starch isomalt composition onto the coating layer enveloping the at least one confectionery core to obtain a coating film,
  b3) crystallizing the coating film obtained in method step b2) of the at least one confectionery core having at least one coating film, c) performing at least one subsequent coating cycle comprising the steps:
  c1) applying the isomalt-containing coating medium to the at least one coating film to obtain at least one further coating layer enveloping the core and
  c2) sprinkling the at least one powdered rice starch isomalt composition onto the coating layer enveloping the at least one confectionery core to obtain a further coating film,
  c3) crystallizing the coating film obtained in method step c2) of the at least one confectionery core having at least one coating film, X) performing at least one method step to obtain at least one further coating layer enveloping the core, wherein after method step b) and before method step e), the isomalt-containing coating medium is applied at least once to the at least one coating film to obtain at least one further coating layer enveloping the core without subsequent sprinkling of the at least one powdered rice starch isomalt composition onto the coating layer surrounding the at least one confectionery core, d) wherein at least one drying is performed according to method step b) and e) obtaining a confectionery product having a sugar-free coating covering.

A particularly preferred embodiment can provide that method step X) is performed at least once, at least twice, at least 3 times, particularly once, twice, 3 times or more than 3 times.

In a particularly preferred embodiment, it is provided that method step d) is performed at least once, particularly at least 2 times, particularly 3 times, particularly once, 2 times, 3 times, or more than 3 times.

In a particularly preferred embodiment, it is provided that method step X) is performed before method step d).

In a particularly preferred embodiment, it is provided that at least one method step X) is performed immediately before method step d), that is, without the interposition of one or more than one method step.

In a particularly preferred embodiment, it is provided that method step X) is performed immediately before performing a first, second and/or further method step d), that is, without the interposition of one or more than one method step. In a particularly preferred embodiment, it is provided that at least one method step X) is performed immediately before the first, second and/or further performance of a method step d).

In a particularly preferred embodiment, it is provided that at least one method step X) is performed immediately before a method step d) is performed for the first time.

In a particularly preferred embodiment of the present invention, method step X) is performed both before and after method step d).

Method step X) serves in an advantageous manner according to the invention to protect the coating film applied in method step b) or c) or b) and c) before performing drying step d) and to ensure particularly gentle drying. The method according to the invention therefore provides particularly to apply coating films to a confectionery core by means of initial and subsequent coating cycles and to dry these separately outside of the initial and subsequent coating cycles in at least one method step d), wherein at least one drying step d), particularly all drying steps d) that may be performed, in a preferred embodiment, only takes/take place after at least one method step X) has been performed, wherein method step X) allows particularly gentle drying.

In a preferred embodiment, it is provided that at least one method step X) takes place immediately before performing a method step d), particularly immediately before performing a first performance of method step d). Without being bound by theory, the application of at least one coating layer in method step X) also means that the at least one coating film applied in method steps b) and/or c), particularly powdery components thereof, is not rubbed off.

The present invention also relates to a method for producing a confectionery product having a sugar-free coating covering, comprising the following method steps, particularly consisting of the following method steps:
a) providing at least one confectionery core, an isomalt-containing coating medium and at least one powdered rice starch isomalt composition, wherein the at least one powdered rice starch isomalt composition has at least 30% by weight of rice starch (based on the total weight of the total dry substance of the at least one rice starch isomalt composition),
b) performing an initial coating cycle comprising the following steps:
　b1) applying the isomalt-containing coating medium to the at least one confectionery core to obtain a coating layer enveloping the core and
　b2) sprinkling the at least one powdered rice starch isomalt composition onto the coating layer enveloping the at least one confectionery core to obtain a coating film,
　b3) crystallizing the coating film obtained in method step b2) of the at least one confectionery core having a coating film,
c) performing at least one subsequent coating cycle comprising the steps:
　c1) applying the isomalt-containing coating medium to the at least one coating film to obtain at least one further coating layer enveloping the core and
　c2) sprinkling the at least one powdered rice starch isomalt composition onto the coating layer enveloping the at least one confectionery core to obtain a further coating film,
　c3) crystallizing the coating film obtained in method step c2) of the at least one confectionery core having at least one coating film,
d) wherein at least one drying is performed according to method step b) and
e) obtaining a confectionery product having a sugar-free coating covering.

The present invention accordingly provides a method for producing a confectionery product having a sugar-free coating covering, wherein at least one confectionery core, an isomalt-containing coating medium and at least one powdered rice starch-isomalt composition is provided in a first method step a).

An initial coating cycle is performed in a second method step b), which itself comprises at least three sub-steps, particularly consists of exactly three sub-steps. The at least three sub-steps b1), b2) and b3) are performed one after the other, particularly immediately one after the other, that is, preferably without intermediate steps, wherein in b1), an isomalt-containing coating medium is applied to the at least one confectionery core to obtain a coating layer enveloping the core, that is, a core having a coating layer which partially or completely envelops the core, and in a subsequent second method step b2), at least one powdered rice starch isomalt composition is sprinkled onto the coating layer enveloping the at least one confectionery core in order to thus obtain a coating film, wherein this coating film partially or completely envelops the confectionery core. In a third sub-step b3), the one coating film, obtained in sub-step b2), of the at least one confectionery core having a coating film is then crystallized, particularly dried. In this case, in a preferred embodiment, the dissolved isomalt is advantageously crystallized in the coating film.

In a further method step c), at least three, particularly exactly three, sub-steps are performed in a subsequent coating cycle, that is, method step c) comprises at least three sub-steps, particularly, it consists of exactly three sub-steps. The at least three sub-steps c1), c2) and c3) are performed one after the other, particularly immediately one after the other, that is, preferably without intermediate steps. In a sub-step c1), an isomalt-containing coating medium is applied to at least one coating film, that is, at least one coating film which envelops a confectionery core, and at least one further coating layer which partially or completely envelops the core, that is, the core enveloped with a coating film, is obtained. In a subsequent sub-step c2), at least one powdered rice starch isomalt composition is sprinkled onto this at least one further coating layer to obtain a further coating film which partially or completely envelops the at least one confectionery core having at least one coating film. In a third sub-step c3), the one coating film, obtained in the previous sub-step c2), of the at least one confectionery core having at least one coating film is then crystallized, particularly dried. In this case, in a preferred embodiment, the dissolved isomalt is advantageously crystallized in the coating film.

In an advantageous embodiment, method step c) can be performed at least twice, particularly at least 9 times. A corresponding number of applied coating films results from the corresponding number of method steps c) performed (that is, cycles).

According to the invention, it is preferred or necessary in at least one additional method step X) after method step b) and before method step e), particularly before method step d), particularly immediately, that is, preferably without the interposition of one or more than one method step, before method step d), preferably at least once, the at least one coating medium is applied to the at least one coating film to obtain at least one further coating enveloping the core without subsequent sprinkling of the at least one powdered rice starch isomalt composition onto the coating layer enveloping the at least one confectionery core.

In a further method step d), at least one drying is performed according to method step b), that is, that a confectionery core provided according to the invention having at least one coating film is dried.

In a preferred embodiment, it is provided that the drying according to method step d) is performed after method step b) and before method step c). According to the invention, it is provided in a preferred embodiment that the drying according to method step d) is performed after at least one method step c). In a preferred embodiment, it is provided that the drying according to method step d) is performed at least once, particularly at least twice, particularly twice, particularly 3 times, during the procedure according to the invention, wherein at least one method step c), preferably 1 to 15 method steps c), is or are performed between method steps d). According to the invention, it is provided in a preferred embodiment that at least two method steps d) are performed, particularly one method step d) in each case after method step b) and/or one or more than one method step d) after performing a method step c), wherein at least one method step c) is performed in each case between the method steps d).

In a further particularly preferred embodiment, it is provided that the drying according to method step d) is performed immediately after performing method step c) at least once and before method step e), particularly preferably immediately after performing at least one method step c) for the first time, particularly preferably after a phase of method steps c) has been performed for the first time.

In a particularly preferred embodiment, it is provided that the drying according to method step d) is performed after method step b) and before method step e), that is, before the confectionery product having a sugar-free coating covering is obtained. In a particularly preferred embodiment, it is provided that method step d) is performed after method step b) and before method step e), wherein at least two method steps c), that is, at least two subsequent coating cycles are performed and wherein at least one of method steps c) is performed after method step d).

In a further method step e), a confectionery product having a sugar-free coating covering is obtained. The coating covering obtained according to the invention comprises at least, particularly consists of, two coating films.

In a preferred embodiment, a colorant-free, particularly $TiO_2$-free, coating medium is used according to the invention and during coating, particularly during method steps b), c) and d), particularly during method steps b), c), d) and X), no colorant, particularly no $TiO_2$ (titanium dioxide) is added, so that a confectionery product is produced, the coating covering of which is colorant-free, particularly $TiO_2$-free.

In a particularly preferred embodiment of the present invention, the isomalt-containing coating medium does not contain any gum arabic.

In a particularly preferred embodiment of the present invention, the sugar-free coating covering of the confectionery product produced according to the invention has no gum arabic.

In a particularly preferred embodiment, a gum arabic-free coating medium is used according to the invention and no gum arabic is added during the coating, particularly during method steps b), c) and d), particularly during method steps b), c), d) and X), so that a confectionery product is produced, the coating covering of which is gum arabic-free.

In a particularly preferred embodiment of the present invention, a colorant-free, particularly $TiO_2$-free and gum arabic-free, coating medium is used and during coating, particularly during method steps b), c) and d), particularly during method steps b), c), d) and X), no colorant, particularly no $TiO_2$, and no gum arabic is added, so that a confectionery product is produced, coating covering of which is free of colorant, particularly free of $TiO_2$ and gum arabic.

In a preferred embodiment of the present invention, there is therefore provided a sugar-free, colorant-free, particularly $TiO_2$-free, and gum arabic-free coating covering, particularly chewing gum.

The method according to the invention, particularly the use of a powdered rice starch isomalt composition and particularly the drying of a coating film comprising an isomalt-containing coating medium and at least one powdered rice starch isomalt composition, advantageously leads to an especially white confectionery product having a sugar-free coating covering. The use of a powdered rice starch isomalt composition leads to a particularly fast build-up of the coating covering compared to the use of pure rice starch.

According to the invention, in a preferred embodiment, it is provided that the rice starch isomalt composition used in method steps b2) and c2) is applied in solid, that is, powdery form, as it were as a pigment, to the surface of a coating layer, as it were glued. According to the invention, it is preferably provided that the rice starch isomalt composition is not present in an aqueous dispersion and is accordingly not applied in a conventional manner, that is, not in the usual way. In a preferred embodiment, this avoids the rice starch, which is longer dispersed in water, in combination with isomalt leading to undesirable color tones.

In a particularly preferred embodiment, the confectionery core provided in method step a) is a sweet or non-sweet confectionery core.

In a particularly preferred embodiment, the confectionery core provided in method step a) is a sweet confectionery core.

In a particularly preferred embodiment, the confectionery core provided in method step a) is a non-sweet confectionery core.

In a particularly preferred embodiment, the confectionery core, provided in method step a), is a chewing gum core, a chocolate core, a hard caramel core, a soft caramel core, a gelatin-based or gelatin-like core, foam sugar core, flake core, dragée core, compressed core, candied fruit core, brittle core, nougat core, ice confectionery core, licorice core, marzipan core, muesli bar core or ice cream core.

In a particularly preferred embodiment, the confectionery core is a chewing gum core, particularly a sugar-free chewing gum core, particularly an isomalt-containing, particularly an Isomalt ST-containing chewing gum core.

In a particularly preferred embodiment, the chewing gum core is a sugar-free chewing gum core which has isomalt, particularly Isomalt ST, and at least one further sugar alcohol, for example, sorbitol.

In a particularly preferred embodiment, the chewing gum core used according to the invention can have a chewing gum base, sorbitol, isomalt, Lycasin and high-intensity sweeteners, for example, acesulfame-K and aspartame, and flavorings and aromas, for example, menthol and peppermint and colorants.

In a particularly preferred embodiment, the confectionery core provided in method step a) is a pretzel core, licorice core, bacon core, dried meat core, nut core, pomaceous fruit, chocolate core, bread core, crouton core, fish core, vegetable core, seafood core, potato core, chip core or rice or corn waffle core.

In a particularly preferred embodiment, the powdered rice starch isomalt composition used has rice starch and isomalt, particularly consists of these. Particularly, the powdered rice starch isomalt composition used has rice starch grains and powdered isomalt, particularly consists of these.

In a particularly preferred embodiment, the powdered rice starch isomalt composition used has rice starch grains, particularly having a size, particularly diameter, of 2 μm to 9 μm, and powdered isomalt, particularly Isomalt ST or Isomalt PF, particularly consists of these.

In a particularly preferred embodiment, the rice starch in the rice starch isomalt composition is selected from a group consisting of gelatinized rice starch, non-gelatinized rice starch, soluble gelatinized rice starch, soluble non-gelatinized rice starch, granular gelatinized rice starch, granular non-gelatinized rice starch and combinations thereof.

According to the invention, in a particularly preferred embodiment, it is provided that non-gelatinized rice starch is preferably used. According to the invention, gelatinized or pre-gelatinized rice starch is preferred only if, despite the gelatinization, the starch is in the form of starch grains having a size, particularly a diameter, of 2 μm to 9 μm.

In a particularly preferred embodiment, the rice starch is neutral rice starch, particularly powdery neutral rice starch.

In a particularly preferred embodiment, the rice starch is a native rice starch, particularly produced from purified, broken-down rice by extraction and purification of the starch.

In a particularly preferred embodiment, the rice starch is insoluble in cold water.

In a further preferred embodiment, the rice starch has a bulk density of 0.2 to 0.6 g/cm$^3$, particularly 0.3 to 0.5 g/cm$^3$, particularly 0.4 g/cm$^3$.

In a preferred embodiment, the rice starch is in the form of starch grains.

In a preferred embodiment, the rice starch is in the form of starch grains having a size, particularly diameter, of 2 to 9 μm, particularly 2 to 8 μm, particularly 2 to 7 μm, particularly 3 to 9 μm, particularly 3 to 8 μm, particularly 3 to 7 μm, particularly 4 to 9 μm, particularly 4 to 8 μm, particularly 4 to 7 μm.

According to the invention, it has been observed that starch granules of such a size, particularly diameter, advantageously lead to a white coloration of the confectionery product being achieved particularly quickly during production and that the surface of the confectionery product is particularly smooth.

Starch granules can optionally also be in the form of starch agglomerates which have sizes of optionally 50 μm to 1000 μm, particularly 250 μm to 1000 μm, particularly 75 μm to 200 μm. However, the use of rice starch, which is directly in the form of starch grains, particularly having a size, particularly diameter, of 2 μm to 9 μm, is preferred. According to the invention, the rice starch can optionally also be used in the form of agglomerates which quickly disintegrate into starch granules during the method according to the invention.

In a particularly preferred embodiment of the present invention, the rice starch is in powder form.

In a particularly preferred embodiment, it is provided that the isomalt-containing coating medium has 55 to 75% by weight, particularly 60 to 75% by weight, particularly 65 to 75% by weight, particularly 70 to 75% by weight, particularly 55 to 70% by weight, particularly 55 to 65% by weight, particularly 55 to 60% by weight, particularly 60 to 70% by weight (each based on the total weight of the coating medium) isomalt, particularly Isomalt GS.

In a particularly preferred embodiment, it is provided that the isomalt-containing coating medium has a dry substance content of 55 to 80% by weight, particularly 60 to 75% by weight, particularly 65 to 73% by weight, particularly 60 to 73% by weight, particularly 62 to 71% by weight, particularly 60 to 70% by weight (in each case based on the total weight of the coating medium).

In a particularly preferred embodiment, the isomalt-containing coating medium is an aqueous isomalt-containing coating medium.

In a particularly preferred embodiment of the present invention, the isomalt-containing coating medium has at least one further substance selected from the group consisting of carbohydrates, sugar alcohols, sugar substitutes, high-intensity sweeteners, lipids, edible acids, amino acids, colorants, roughage, proteins, flavorings, minerals, metal oxides, vitamins, and combinations thereof.

In a particularly preferred embodiment, the isomalt-containing coating medium has 0.1 to 1% by weight, preferably 0.2 to 0.7% by weight, particularly 0.2 to 0.6% by weight, (in each case based on the total weight of the coating medium) of the at least one further substance.

In a particularly preferred embodiment of the present invention, it is provided that the at least one powdered rice starch isomalt composition provided in method step a) has 30 to 80% by weight, particularly 30 to 70% by weight, particularly 30 to 60% by weight, particularly 30 to 50% by weight, particularly 30 to 40% by weight, particularly 40 to 80% by weight, particularly 50 to 80% by weight, particularly 60 to 80% by weight, particularly 70 to 80% by weight, rice starch (in each case based on the total weight of the total dry substance of the at least one rice starch isomalt composition).

In a particularly preferred embodiment of the present invention, it is provided that the at least one powdered rice starch isomalt composition provided in method step a) has 20 to 70% by weight, particularly 20 to 60% by weight, particularly 20 to 50% by weight, particularly 20 to 40% by weight, particularly 20 to 30% by weight, particularly 30 to 70% by weight, particularly 40 to 70% by weight, particularly 50 to 70% by weight, particularly 60 to 70% by weight, isomalt (in each case based on the total weight of the total dry substance of the at least one rice starch isomalt composition).

In a particularly preferred embodiment, it is provided that the at least one powdered rice starch isomalt composition provided in method step a) has a rice starch to isomalt ratio of 30 to 70% by weight up to 80 to 20% by weight, particularly 40 to 60% by weight, particularly 50 to 50% by weight, particularly 60 to 40% by weight, particularly 70 to 30% by weight, (in each case based on the total weight of the dry substance of the rice starch and the isomalt).

In a particularly preferred embodiment of the present invention, the proportion of the coating covering in the confectionery product is 20 to 60% by weight, particularly 30 to 60% by weight, particularly 40 to 60% by weight, particularly 50 to 60% by weight, particularly 20 to 55% by weight, particularly 30 to 55% by weight, particularly 40 to 55% by weight, particularly 50 to 55% by weight, particularly 20 to 45% by weight, particularly 25 to 45% by weight, particularly 30 to 45% by weight, particularly 35 to 45% by weight, particularly 40 to 45% by weight, particularly 25 to 40% by weight, particularly 25 to 35% by weight, particularly 25 to 30% by weight (in each case based on the total weight of the confectionery product having a sugar-free coating covering).

In a particularly preferred embodiment, the confectionery product having a sugar-free coating covering, particularly the coating covering, has a maximum of small amounts of $TiO_2$, particularly a maximum of 0.05% by weight, particularly a maximum of 0.01% by weight, particularly 0.001% by weight, particularly no $TiO_2$ (in each case based on the total weight of the dry substance of the confectionery product, particularly the coating covering).

In a particularly preferred embodiment, the confectionery product having a sugar-free coating covering is colored white.

In a particularly preferred embodiment, the sugar-free coating covering is colored white.

In a particularly preferred embodiment, the sugar-free coating covering and the confectionery core are colored white.

In a particularly preferred embodiment, the weight ratio between the coating layer and the rice starch isomalt composition, which is sprinkled on in method steps b2) and/or c2), is 65:35 to 55:45, particularly 60:40, particularly 50:50 in the coating covering of the confectionery product obtained in method step e) and having a sugar-free coating covering (based in each case on the total weight of the coating layer and rice starch isomalt composition).

Method steps b3) and c3) are method steps within which the coating films obtained in method steps b2) and c2) are given time to crystallize and dry. Method steps b3) and c3) represent customary, integrated crystallization and drying steps.

In a particularly preferred embodiment, the crystallization time in method step b3) and/or c3), particularly in method step b3), in method step c3) or in method steps b3) and c3), is 2 to 10 minutes.

In a particularly preferred embodiment, the temperature in method step b) and/or c), particularly in method step b), in method step c) or in method steps b) and c), is 15 to 35° C., particularly 20 to 35° C., particularly 25 to 35° C., particularly 30 to 35° C., particularly 15 to 30° C., particularly 15 to 25° C., particularly 15 to 20° C., particularly 20 to 30° C.

In a particularly preferred embodiment, the temperature in method step b) and/or c) is 15 to 30° C.

In a particularly preferred embodiment, in an additional method step X) after method step b) and before method step e), particularly before method step d), the at least one coating medium is applied at least once to the at least one coating film to obtain at least one further coating layer enveloping the core without subsequent sprinkling of the at least one powdered rice starch isomalt composition onto the coating layer enveloping the at least one confectionery core.

In a particularly preferred embodiment, it can be provided that method step X) is performed at least once, preferably twice, preferably more than 2 times, particularly 2 to 50 times, particularly 5 to 40 times, particularly 10 to 30 times. Particularly, it can be provided that method steps X) in the preferred embodiment, according to method step X), are performed more than once, immediately one after the other, that is, is performed in the form of at least one phase, or separately by one or more method steps c) and/or d).

A corresponding number of applied layers results from the corresponding number of method steps X) performed (that is, cycles). Method step X) is also referred to as a sealing step.

In a particularly preferred embodiment of the present invention, method step X) is performed 2 to 5 times, particularly immediately one after the other, that is, in the form of a phase, after method step b) and before method step d), particularly before a first performance of method step d), particularly performed immediately before a first performance of method step d).

In a particularly preferred embodiment, method step X) can be performed in at least two phases, that is, two sequences of directly successive method steps X) that are separate from one another, particularly by method step c) and/or d).

In a particularly preferred embodiment of the present invention, it is provided that a first phase of 2 to 5 method steps X) is performed after a first phase of method steps c) and before method step d), particularly before a first performance of method step d), particularly immediately before a first performance of method step d), and a second phase of method steps X) after a second phase of method steps c).

In a particularly preferred embodiment, a first phase of method steps X) is performed after a first phase of method steps c) and before method step d), particularly a first performance of method step d), particularly immediately before a first performance of method step d), and a second phase of method steps X) is performed after a second phase of method steps c), wherein this second phase of method steps c) is performed after drying according to method step d).

In a particularly preferred embodiment of the present invention, it is provided that immediately after a first phase of method steps c), a drying is performed according to method step d), followed by a second phase of method steps c) and a first phase of method steps X), immediately followed by the performing of a second drying step according to method step d), after which a third phase of method steps c) is performed, immediately followed by a third drying step according to method step d) and a subsequent second phase of method steps X).

In a particularly preferred embodiment of the present invention, a first phase of method steps X) is performed after a first phase of method steps c) and before method step d), particularly immediately before the first performance of method step d), and a second phase of method steps X) is performed after a second phase of method steps c) and an immediately following second drying according to method step d).

In a particularly preferred embodiment of the present invention, the temperature in method step X) is 15 to 35° C., particularly 20 to 35° C., particularly 25 to 35° C., particularly 30 to 35° C., particularly 15 to 30° C., particularly 15 to 25° C., particularly 15 to 20° C., particularly 20 to 30° C.

In a particularly preferred embodiment, the temperature in method step X) is 15 to 30° C., particularly 25° C.

An advantage of the present procedure achieved in a preferred embodiment of the present invention, particularly the use of method step d), is that the proportion of coating covering applied by method step X) can be reduced and thus also the time used therefor. In a particularly preferred embodiment, method step d) provided according to the invention, can achieved that at most 25% by weight of the coating covering is applied by method step X).

In a particularly preferred embodiment, the invention can provide that 1% by weight to 25% by weight, particularly 2% by weight to 23% by weight, particularly 5% by weight to 20% by weight, particularly 10% by weight to 20% by weight of the coating covering is applied by method step X). Method step X) particularly preferably applies 6 to 14% by weight of the coating covering.

In a particularly preferred embodiment of the present invention, method step c) is performed at least 10 times, particularly at least 20 times, particularly at least 30 times, particularly at least 40 times, particularly at least 50 times, particularly exactly 10 times, particularly exactly 20 times, particularly exactly 30 times, particularly exactly 40 times, particularly exactly 50 times.

In a preferred embodiment, method step c) is performed 10 to 70 times, particularly 20 to 60 times, particularly 30 to 50 times, particularly 10 to 25 times.

In a particularly preferred embodiment of the present invention, the drying takes place according to method step d) after method step b) and after at least 5 performances of method step c), particularly after at least 10 performances of method step c), particularly after at least 20 performances of method step c). In this way, in a preferred embodiment, a confectionery product having a particularly smooth surface can particularly be obtained, preferably having a smoother surface in comparison to a confectionery product which is obtained without drying, particularly without drying after at least 5 performances of method step c), particularly after at least 10 performances of method step c), particularly after at least 20 performances of method step c).

In a particularly preferred embodiment, it can be provided that the drying according to method step d) takes place after method step b) and after a first phase of method steps c), and that after the drying according to method step d), a second phase of method steps c) takes place, that is, subsequent coating cycles can take place, particularly 1 to 30, particularly 1 to 20, particularly 1 to 15 times.

In a particularly preferred embodiment of the present invention, method step d) is performed at least twice, particularly 1 to 5 times, particularly 3 to 5 times, in each case after method step b), c), X) or b) and c) and X).

In a particularly preferred embodiment, the drying time in method step d) is 5 to 45 minutes, particularly 10 to 45 minutes, particularly 15 to 45 minutes, particularly 20 to 45 minutes, particularly 25 to 45 minutes, particularly 30 to 45 minutes, particularly 35 to 45 minutes, particularly 40 to 45 minutes, particularly 45 minutes, particularly 5 to 40 minutes, particularly 5 to 30 minutes, particularly 5 to 20 minutes, particularly 5 to 15 minutes, particularly 5 minutes, particularly 15 to 40 minutes, particularly 15 to 35 minutes, particularly 15 to 30 minutes, particularly 15 to 25 minutes, particularly 15 to 20 minutes, particularly 15 minutes.

In a particularly preferred embodiment of the present invention, the drying time in method step d) is 5 to 45 minutes.

In a particularly preferred embodiment, the crystallization time in method step b3) and c3) is 2 to 10 minutes and the drying time in method step d) is 5 to 45 minutes, particularly 15 to 45 minutes, particularly 20 to 45 minutes, particularly 25 to 45 minutes, particularly 30 to 45 minutes, particularly 35 to 45 minutes, particularly 40 to 45 minutes, particularly 15 to 40 minutes, particularly 15 to 35 minutes, particularly preferably 15 to 30 minutes.

In a particularly preferred embodiment, the drying temperature in method step d) is 20 to 45° C., particularly 25 to 45° C., particularly 30 to 45° C., particularly 35 to 45° C., particularly 40 to 45° C., particularly 20 to 40° C., particularly 20 to 35° C., particularly 20 to 30° C., particularly 25 to 40° C., particularly 25 to 35° C., particularly 25 to 30° C., particularly 30 to 40° C., particularly 31 to 40° C.

In a particularly preferred embodiment of the present invention, the drying temperature in method step d) is 35 to 45° C.

In a particularly preferred embodiment of the present invention, the drying in method step d) is performed at a temperature of 35 to 45° C. for 5 to 45 minutes.

In a preferred embodiment, the drying temperature according to method step d) is higher than the temperature in method step b) and/or c), particularly higher than in method step c). In a particularly preferred embodiment, the invention provides that the drying temperature in method step d) is higher than the temperature used in method step b), in method step c) or in method step b) and c), particularly the temperature used in method step b3), in method step c3) or in method steps b3) and c3), particularly in the coating device.

In a particularly preferred embodiment, the temperature in method step b) is 15 to 30° C., particularly 15 to 25° C., particularly 15 to 20° C., particularly preferably 20 to 30° C., and the drying temperature according to method step d) is 35 to 45° C., particularly preferably 35 to 40° C.

In a particularly preferred embodiment, the temperature in method step c) is 15 to 30° C., particularly 15 to 25° C., particularly 15 to 20° C., particularly preferably 20 to 30° C., and the drying temperature according to method step d) is 35 to 45° C., particularly preferably 35 to 40° C.

In a particularly preferred embodiment, the temperature in method step b) and c) is 15 to 30° C., particularly 15 to 25° C., particularly 15 to 20° C., particularly preferably 20 to 30° C., and the drying temperature according to method step d) is 35 to 45° C., particularly preferably 35 to 40° C.

In a particularly preferred embodiment, the temperature in method step b3) is 15 to 30° C., particularly 15 to 25° C., particularly 15 to 20° C., particularly preferably 20 to 30° C., and the drying temperature according to method step d) is 35 to 45° C., particularly preferably 35 to 40° C.

In a particularly preferred embodiment, the temperature in method step c3) is 15 to 30° C., particularly 15 to 25° C., particularly 15 to 20° C., particularly preferably 20 to 30° C., and the drying temperature according to method step d) is 35 to 45° C., particularly preferably 35 to 40° C.

In a particularly preferred embodiment, the temperature in method step b3) and c3) is 15 to 30° C., particularly 15 to 25° C., particularly 15 to 20° C., particularly preferably 20 to 30° C., and the drying temperature according to method step d) is 35 to 45° C., particularly preferably 35 to 40° C.

In a particularly preferred embodiment, the present invention also relates to a confectionery product having a sugar-free coating covering, particularly a chewing gum, which can be produced, particularly is produced, by a method according to the invention.

In a particularly preferred embodiment, method steps a) to e) including X) can be performed in a coating device which has a coating drum, for example, a driacoater. Method step d) can preferably be performed in a coating device which has a coating drum, for example, in an automated coating device which preferably has a programmable control unit.

In a particularly preferred embodiment, the invention provides in method step d) a rotation of the coating drum at a low rotational speed or, in a further embodiment, an alternating rotation, preferably at a low rotational speed, and stopping of the coating drum.

In a preferred embodiment, it is provided that the confectionery cores are moved in method step d) at a low rotational speed, particularly wall speed, particularly less than during method steps b) or c) or b) and c). In a particularly preferred embodiment, it is provided that the rotational speeds, particularly wall speeds, in the coating drum in method step d) are lower than during method steps b) or c), or b) and c), particularly by at least 70%, at least 80%, at least 85%, preferably at least 90% lower.

In a particularly preferred embodiment, in method step d), the coating drum is alternating moved, particularly rotated, particularly at the above lower wall speeds, and stopping.

In a particularly preferred embodiment, the wall speed in method step d) is from 150 cm/min to 200 cm/min, particularly 180 cm/min to 190 cm/min, particularly 188 cm/min.

In a particularly preferred embodiment, particularly two method steps d) can be performed, particularly at 35° C. for 30 minutes each.

According to the invention, it can also be provided to perform three method steps d), particularly at 35° C. for 15 minutes each.

In a particularly preferred embodiment, it can be provided, after each performance of one, two, three, four or all five method steps b1), b2), c1), c2) and/or X), to perform a distribution step of the respectively applied components, namely the coating medium and/or the rice starch isomalt composition, particularly so that the most homogeneous possible distribution is on the respective surface to be coated.

In a further preferred embodiment, it can be provided that the confectionery product obtained in method step e) is subjected to customary further processing steps, particularly to a polishing and/or a growth step.

In a particularly preferred embodiment of the invention, after the components used according to the method have been provided in method step a), method step b) can then be performed once, then 2 to 15 times, particularly 5 to 12 times, preferably 9 times, particularly 10 times, method step c) then preferably 1 to 5 times, preferably 1 to 3 times, preferably 2 times, method step X), immediately afterwards, method step d) once, at 30° C. to 45° C., particularly at 35° C. to 45° C., for 5 to 45 minutes, particularly at 40° C. and for 35 minutes, particularly at 35° C. and for 30 minutes, then method step c) 1 to 20 times, particularly 5 to 15 times, particularly 15 times, wherein method step X) is then performed preferably 1 to 20, particularly 10 up to 20, particularly 17 times. The product subsequently obtained in method step e) can either be waxed or not waxed.

In a particularly preferred embodiment of the invention, after the components used according to the process have been provided in method step a), method step b) can then be performed once, then method step c) 2 to 15 times, particularly 5 to 12 times, preferably 9 times, particularly 10 times, method step c) then preferably 1 to 5 times, preferably 2 to 5 times, preferably 5 times, method step X), immediately afterwards method step d) once, at 30° C. to 45° C., particularly at 35° C. to 45° C., for 5 to 45 minutes, particularly at 40° C. and for 35 minutes, particularly at 35° C. and for 30 minutes, then method step c) 1 to 20 times, particularly 5 to 15 times, particularly 7 times, particularly 15 times, wherein preferably afterwards, method step X) is performed 1 to 30, in particular 15 to 30, in particular 26 times. The product subsequently obtained in method step e) can either be waxed or not waxed.

In a further particularly preferred embodiment of the invention, after providing the components used according to the method in method step a) and performing method step b) once, method step c) can then be performed 2 to 15 times, particularly 5 to 15 times, particularly 5 times. Method step d) is then performed at 30 to 45° C., particularly 35 to 45° C., for 5 to 15 minutes, particularly 35° C. for 15 minutes. Method step c) is then performed 2 to 15 times, particularly 3 to 10 times, particularly 5 times. Method step X) is then performed 1 to 5 times, particularly 1 to 3 times, particularly 2 times. Immediately thereafter, method step d) is performed once at 30 to 45° C., particularly 35 to 45° C. for 5 to 15 minutes, particularly 35° C. for 15 minutes. Method step c) is then performed 1 to 20 times, particularly 5 to 15 times, particularly 15 times. Method step d) is then performed once at 30 to 45° C., particularly 35 to 45° C., for 5 to 15 minutes, particularly 35° C. for 15 minutes. Method step X) is then performed 1 to 30 times, particularly 10 to 30 times, particularly 10 to 20 times, particularly 12 times. The product subsequently obtained in method step e) can be waxed or not waxed.

In a further particularly preferred embodiment of the invention, after providing the components used according to the method in method step a) and performing method step b) once, method step c) can then be performed 2 to 15 times, particularly 5 to 12 times, particularly 9 times. Method step X) is then performed preferably 1 to 5 times, preferably 1 to 3 times, particularly 2 times. Immediately thereafter, method step d) is performed once at 30° C. to 45° C., particularly at 35° C. to 45° C. for 5 to 45 minutes, particularly at 35° C. for 30 minutes. Following this, method step c) is performed 1 to 20 times, particularly 5 to 15 times, particularly 15 times, then method step d) is performed at 30° C. to 45° C., particularly at 35° C. to 45° C., for 5 to 45 minutes, preferably at 40° C. and for 35 minutes, particularly at 35° C. and for 30 minutes, then method step X) is performed 1 to 30 times, particularly 10 to 30 times, particularly 15 to 30 times, particularly 17 to 25 times, particularly 17 times. The product subsequently obtained in method step e) can be waxed or not waxed.

In connection with the present invention, a "sugar-free coating covering" is understood to mean the envelope of a confectionery product which has at least two coating films and at most small amounts of sucrose, particularly at most 0.5% by weight, particularly at most 0.1% by weight, particularly at most 0.01% by weight, particularly no sucrose (based on the total weight of the dry substance of the coating covering).

In connection with the present invention, a "confectionery product" is understood to mean a product which has a sweet taste. This taste can be conveyed by the confectionery core and/or by a coating covering.

In connection with the present invention, a "confectionery core" is understood to mean a solid and/or liquid composition which can be sweet or non-sweet.

In connection with the present invention, an "isomalt-containing coating medium" is understood to mean a solution or suspension (also referred to as syrup), particularly a solution, or particularly a syrup, particularly an aqueous solution or aqueous suspension which comprises isomalt and is suitable for the coating of a confectionery core.

In connection with the present invention, the term "isomalt" refers to a mixture of 6-O-α-D-glucopyranosyl-D-sorbitol (1,6-GPS) and 1-O-α-D-glucopyranosyl-D-mannitol (1,1-GPM) and optionally 1-O-α-D-glucopyranosyl-D-sorbitol (1,1-GPS), particularly Isomalt GS or Isomalt ST.

In connection with the present invention, "Isomalt GS" is understood to mean a mixture of 72 to 78% by weight, preferably 75% by weight, 1,6-GPS and 22 to 28% by weight, particularly 25% by weight, 1,1-GPM (in each case based on the total weight of the dry substance of the Isomalt GS).

In connection with the present invention, "Isomalt ST" is understood to mean a mixture of 53 to 47% by weight 1,6-GPS and 47 to 53% by weight 1,1-GPM (based on the dry weight of the Isomalt GS).

In a preferred embodiment, isomalt is used in powder form, particularly Isomalt ST-PF.

In connection with the present invention, a "starch grain" is understood to mean a particle of starch which has a size, particularly a diameter, of a maximum of 9 µm. Several such grains can form agglomerates of larger size.

In connection with the present invention, "powdery" is understood to mean a solid, particulate state.

In connection with the present invention, "rice starch" is understood to mean a starch-containing composition made of rice which can be obtained particularly from rice grains and which is characterized particularly by the fact that it essentially comprises carbohydrates obtained from rice grains, particularly consists thereof. For example, the rice starch can be obtained from rice grains from *Oryza sativa* ssp. *japonica*, *O. sativa* ssp. *sinica*, *O. sativa* ssp. *indica*, *O. sativa* ssp. *aromatic* or *O. sativa* ssp., wherein rice starch preferably made from rice grains of *O. sativa* ssp. *indica* is obtained.

In connection with the present invention, a "coating layer" is understood to mean a layer which envelops a confectionery core and which was obtained from a coating medium applied to a core.

In connection with the present invention, a "coating film" is understood to mean a layer enveloping a confectionery core, which layer is obtained by sprinkling a powdered rice starch isomalt composition used according to the invention on a coating layer, that is, the coating film comprises the coating layer applied to the core and obtained from the coating medium and the rice starch isomalt composition sprinkled thereon.

In connection with the present invention, a "coating covering" is understood to mean the entirety of all coating films and possibly any coating layers that are applied according to method step X).

In connection with the present invention, a "crystallization according to method step b3) and c3)" is understood to mean a method step which is customary per se and which takes place after the powdered rice starch-isomalt composition has been sprinkled onto the at least one coating layer and is used for crystallization.

The crystallization does not represent drying in the sense of method step d). Particularly, drying according to method step d) can take place after a crystallization according to method step b3) and/or c3). According to the invention, crystallization is preferably combined with drying. According to a particularly preferred embodiment, a crystallization is a drying. In contrast to drying, crystallization leads to the formation of crystals in the coating film obtained in the previous method step b2) and/or c2). A drying according to method step d) does not involve the formation of crystals and further differs from the crystallization according to the invention in terms of technical parameters such as time and/or temperature.

In connection with the present invention, "drying" is understood to mean a drying step which is performed after an initial coating or subsequent coating cycle. According to the invention, "drying" does not represent "crystallization". Particularly, the drying can differ from the crystallization according to the invention by technical parameters such as time and/or temperature. In a particularly preferred embodiment, the invention therefore provides that the drying temperature in method step d) is above the temperature used in method step b), in method step c) or in method step b) and c), particularly that in method step b3), in method step c3) or in method step b3) and c3), particularly in the coating device. The drying serves particularly to maintain the optical function of the rice starch in connection with isomalt by driving out any water that may be present.

In connection with the present invention, an "initial coating cycle" is understood to mean a cycle in which a first coating film is partially or completely applied to a confectionery core, dried and crystallized in the method.

In connection with the present invention, a "subsequent coating cycle" is understood to mean a cycle in which a further coating film is partially or completely applied to a confectionery core having a coating film and is dried.

In connection with the present invention, a "sealing step" is understood to mean a method step in which the isomalt-containing coating medium is applied at least once to the coating film obtained in method step b) and/or c) without subsequently at least one powdered rice starch isomalt composition being sprinkled onto the coating layer enveloping the at least one confectionery core and is applied according to this method step X).

In connection with the present invention, a cycle is understood to mean performing method step b), c), d) or X).

In connection with the present invention, a phase is understood to mean a sequence of at least two immediately successive method steps b), c), d) or X). Such phases have cycles having identical or approximately the same parameters such as application amount, distribution time and/or crystallization and/or drying time.

In connection with the present invention, a temperature in method step b) and a temperature in method step c), particularly in method step b3) and in method step c3), are understood to mean the ambient temperature, that is, the temperature present in the coating device, particularly the coating drum. In a particularly preferred embodiment, this can therefore be the temperature of the air present in the coating device, particularly the coating drum.

In connection with the present invention, the word sequence "immediately before" or "immediately after" in relation to two related method steps means that the two related method steps are performed staggered in time, namely such that no interposition of one or more than one method step takes place between the two method steps.

In connection with the present invention, the word sequence "and/or" means that all members of a group which are connected by the term "and/or" are disclosed both as alternatives to one another and in each case cumulatively with one another in any combination. As an example, this means for the expression "A, B and/or C" that the following disclosure content is to be understood: i) (A or B or C), or ii) (A and B), or iii) (A and C)), or iv) (B and C), or v) (A and B and C).

In connection with the present invention, the presence of a "white" coloration is determined optically, preferably by means of a spectrophotometer, particularly a spectrophotometer CM-5 from MINOLTA®, wherein the color values L*, a*, b*, C* and h° are measured in transmission and reflection (the results are stated in international CIELAB (L*, a*, b*) and CIELCH (L*, C*, h°) values (Commission Internationale de l'Eclairage, Vienna)) of the confectionery product, particularly in accordance with DIN 5033 (1983-07 edition), DIN 6167 (1980-01 edition), DIN 6174 (1979-01 edition), DIN 55981 (1979-05 edition) and/or DIN EN 1557 (1996 edition).

The parameters mean: L*=brightness (0 to 100), a*=red to green (−150 to 100), b*=yellow to blue (−100 to 150), C*=hue (0 to 150) (chroma) and h°=chroma in ° (hue angle).

In a particularly preferred embodiment, the brightness value L* obtained according to the method according to the invention with the coating covering of the confectionery product produced according to the invention is particularly high, particularly higher than in the case of known confectionery products without colorants, particularly without $TiO_2$.

If, in connection with the present invention, the first and second decimal places or the second decimal places are/is not specified in a number, these are/is to be set as zero.

If quantitative information, particularly percentages, of components of a product or a composition is given in connection with the present invention, these add up, unless explicitly stated otherwise or professionally evident, together with the other explicitly stated or technically apparent further components of the composition or of the product to 100% of the composition and/or the product.

If, in connection with the present invention, a "presence", a "containing" or a "having" of a component in an amount of 0% by weight is expressly mentioned or implied, this means that the respective component is not present in a measurable amount, particularly, does not exist.

Further advantageous refinements emerge from the subclaims.

BRIEF DESCRIPTION OF THE SEVERAL VIEWS OF THE DRAWING(S)

The invention is explained in more detail with reference to the following figures and the examples.

The figures show:

FIG. 1 the sequence of cycles of Trials 1 and 2 of Example 1. The bars represent the amount of coating medium used, the interconnected triangles the amount of powdered Isomalt (ST PF) used and the interconnected circles the amounts of powdered rice starch used (Remy B7).

Figure 2:
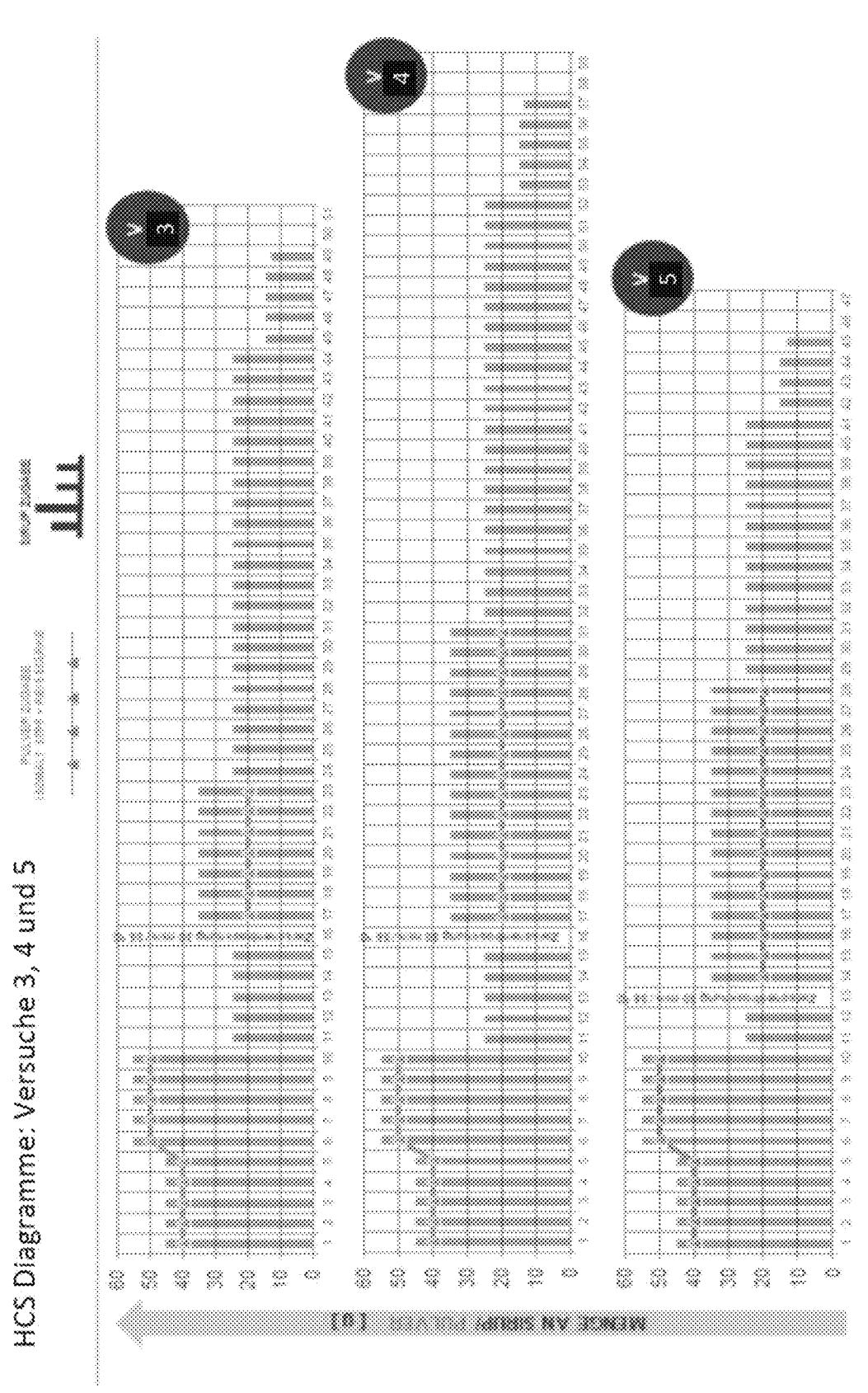

FIG. 2 the sequence of cycles of Trials 3, 4 and 5 of Example 1. The bars represent the amount of coating medium used and the interconnected triangles the amount of powdered rice starch isomalt composition used.

Figure 3:
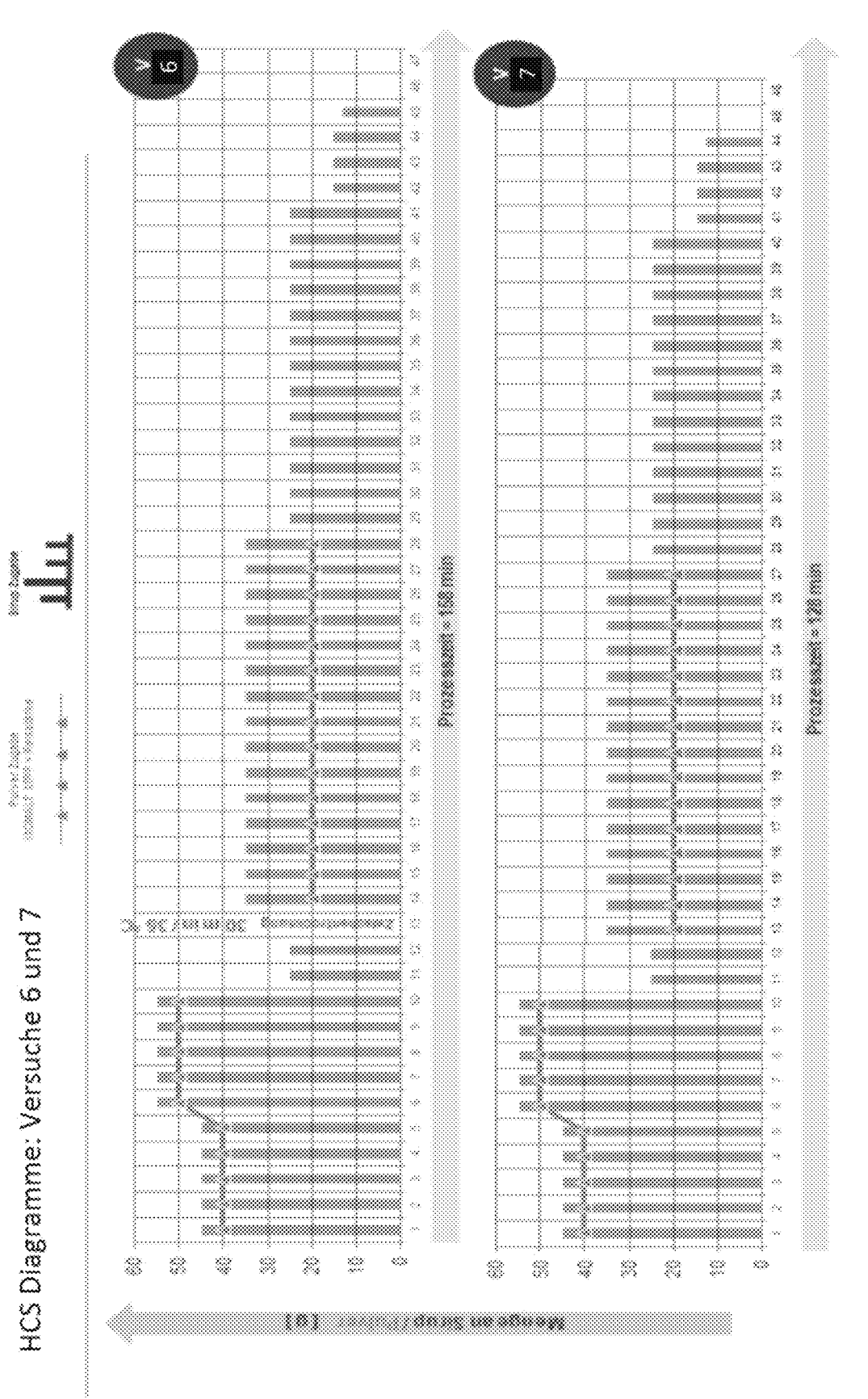

FIG. 3 the sequence of cycles of Trials 6 and 7 of Example 1. The bars represent the amount of coating medium used and the interconnected triangles the amount of powdered rice starch isomalt composition used.

Figure 4:
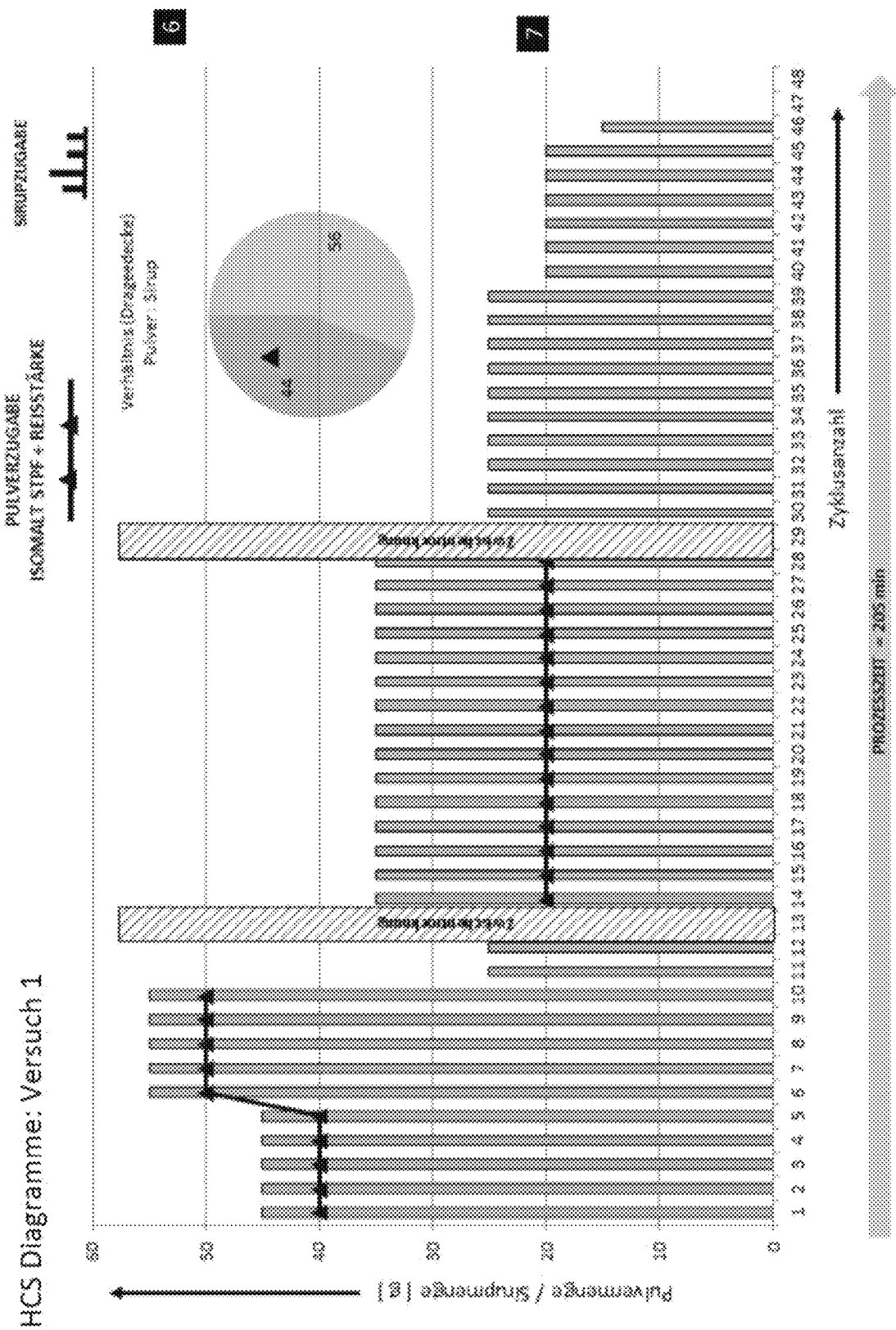

FIG. 4 the sequence of cycles of Trial 1 of Example 2. The bars represent the amount of coating medium used and the interconnected triangles the amount of powdered rice starch isomalt composition used. The cake diagram reflects the weight ratio between the coating layer and the powder sprinkled on the coating covering of the confectionery product obtained.

Figure 5:
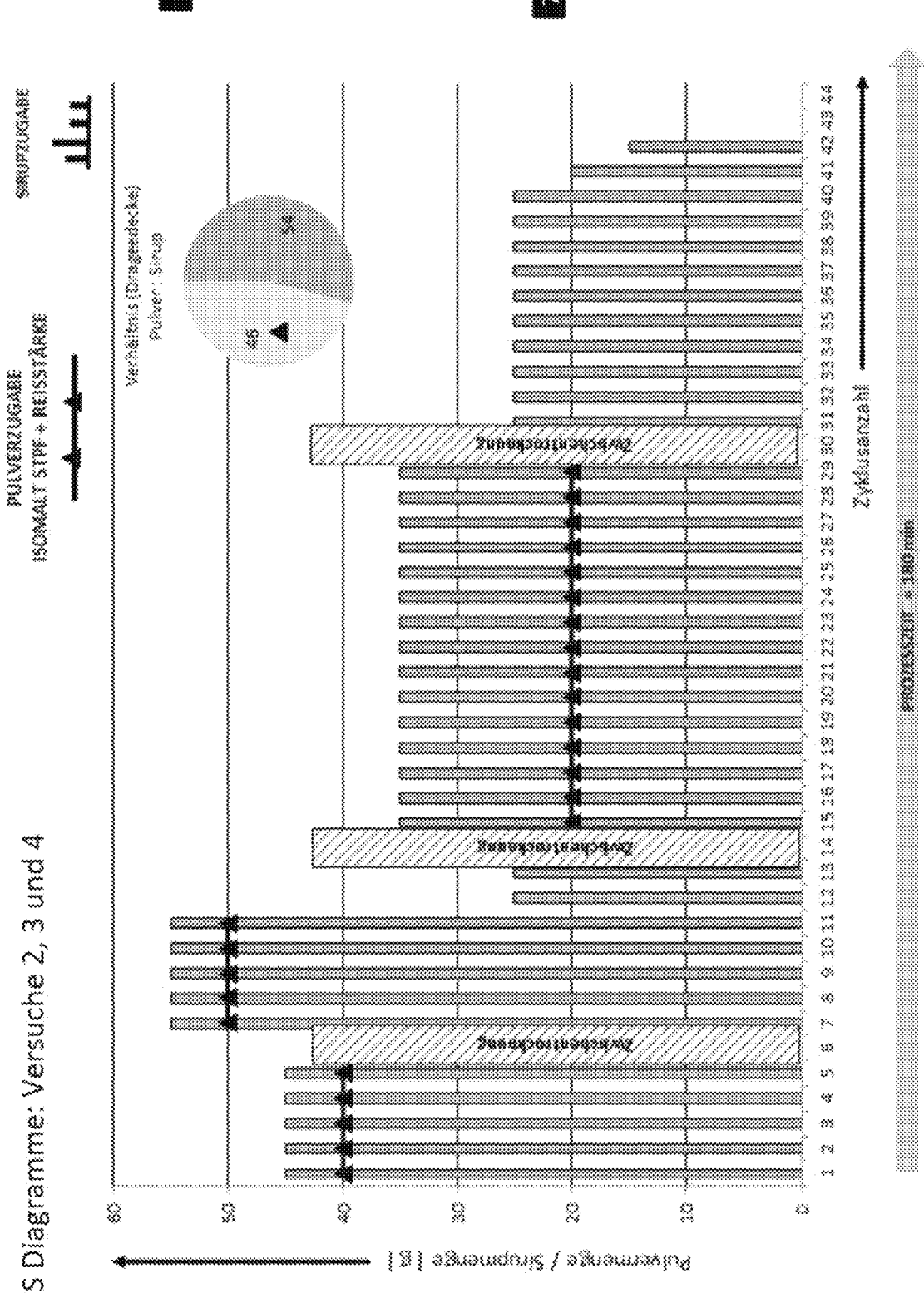

FIG. 5 the sequence of cycles of Trials 2, 3 and 4 of Example 2. The bars represent the amount of coating medium used and the interconnected triangles the amount of powdered rice starch isomalt composition used. The cake diagram reflects the weight ratio between the coating layer and the powder sprinkled on the coating covering of the confectionery product obtained.

Figure 6:
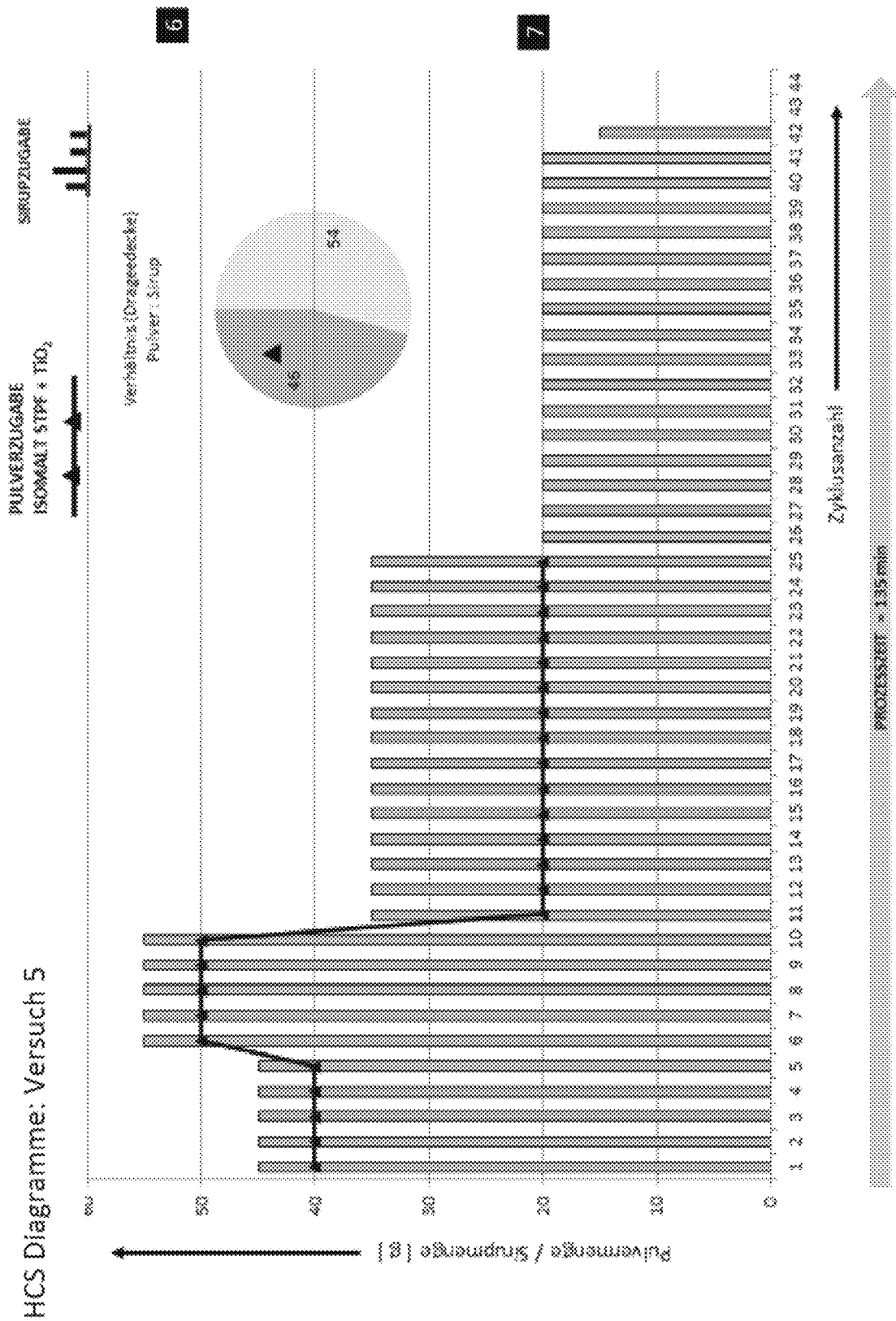

FIG. 6 the sequence of cycles of Trial 5 of Example 2. The bars represent the amount of coating medium used and the interconnected triangles the amount of powdered isomalt-$TiO_2$ composition used. The cake diagram reflects the weight ratio between the coating layer and the powder sprinkled on the coating covering of the confectionery product obtained.

DETAILED DESCRIPTION OF THE INVENTION

The amount of syrup (coating medium) or powder is indicated in grams on the Y-axis in all the diagrams of the figures of Trials 1 to 7 of Example 1 and in all diagrams of the figures of Trials 1 to 5 of Example 2.

The cycle numbers of the respective trials are indicated on the X-axis in all the diagrams of the figures of Trials 1 to 7 of Example 1 and in all diagrams of the figures of Trials 1 to 5 of Example 2.

Syrup means coating medium, powder means powdery component for sprinkling (application), for example, isomalt, rice starch, rice starch-isomalt composition or isomalt-$TiO_2$ composition.

Example 1

In Trials 1 to 7, described below, seven different confectionery products in the form of chewing gum, which have a sugar-free coating covering, were produced.

Trials 1, 2 and 7 represent control trials not according to the invention. Table 1 shows the compositions of the isomalt-containing coating medium, the powdered rice starch isomalt composition and further ingredients.

Cores of the following composition were used in Trials 1 and 2:

Soft chewing gum base 16%, hard chewing gum base 16%, Sorbitol P60 Roquette 29.2%, Isomalt ST PF Beneo 25%, Lycasin 80/55 Roquette 10.6%, menthol spray-dried, Symrise 1.5%, peppermint oil Symrise 1.5%, Acesulfame K Beneo 0.1% and aspartame Beneo 0.1% (percentages based on the total mass of chewing gum base).

In Trial 2, $TiO_2$ was added to the coating medium so that the coating covering has $TiO_2$. The coating covering of all other Trials 1 and 3 to 7 are colorant-free, particularly free of $TiO_2$.

Commercially available chewing gum cores were used in Trials 3 to 7.

2.5 kg of uncoated cores were used per trial.

TABLE 1

Composition of the isomalt-containing coating medium, the powdered rice starch-isomalt composition and further ingredients

| | Trial 1 | Trial 2 | Trial 3 | Trial 4 | Trial 5 | Trial 6 | Trial 7 |
|---|---|---|---|---|---|---|---|
| Coating medium | | | | | | | |
| Isomalt GS [% by weight] | 65.00 | 67.00 | 65.00 | 65.00 | 65.00 | 65.00 | 65.00 |

TABLE 1-continued

Composition of the isomalt-containing coating medium, the powdered
rice starch-isomalt composition and further ingredients

|  | Trial 1 | Trial 2 | Trial 3 | Trial 4 | Trial 5 | Trial 6 | Trial 7 |
|---|---|---|---|---|---|---|---|
| Water (demineralized) [% by weight] | 32.25 | 30.00 | 34.40 | 34.40 | 34.40 | 34.40 | 34.40 |
| Remy B7 (rice starch) [% by weight] | 2.50 | 3.00 | — | — | — | — | — |
| Sucrose ester SP50 [% by weight] | 0.25 | — | 0.50 | 0.50 | 0.50 | 0.50 | 0.50 |
| Aspartame/Ace-sulfame K (1:1) [% by weight] | — | — | 0.10 | 0.10 | 0.10 | 0.10 | 0.10 |
| Rice starch isomalt application |  |  |  |  |  |  |  |
| Isomalt ST PF [g] | 450 | 450 | — | — | — | — | — |
| Remy B7 (rice starch) [g] | 300 | 400 | — | — | — | — | — |
| Mix Isomalt ST PF + Remy B7 (rice starch) (1:1 [g] | — | — | 590 | 750 | 750 | 750 | 750 |
| Weight of uncoated cores [kg] | 2.5 | 2.5 | 2.5 | 2.5 | 2.5 | 2.5 | 2.5 |
| Adding flavor to the coating [g] | — | — | — | 4 × 20 | 4 × 20 | 4 × 20 | 4 × 20 |
| Spectra Flechs (E1 33 brilliant blue FCF) [g] | — | — | — | — | 2.10 | — | — |

(Ratio of coating medium to powdered rice starch isomalt composition: Trial 3 60:40, Trial 4: 62:38, Trial 5: 56:44, Trial 6: 56:44, Trial 7: 56:44)

Table 2 summarizes the production method for each of the seven confectionery products:

TABLE 2

Production method of the seven confectionery products

|  | Trial 1 | Trial 2 | Trial 3 | Trial 4 | Trial 5 | Trial 6 | Trial 7 |
|---|---|---|---|---|---|---|---|
| Coating time [min] | 266 | 215 | 167 | 189 | 159 | 158 | 128 |
| Proportion of the coating covering [% by weight] | 36.1 | 33.3 | 30.3 | 37.2 | 33.7 | 33.7 | 33.6 |
| Number of phases | 10 | 9 | 6 | 6 | 6 | 6 | 6 |
| Number of cycles | 74 | 55 | 49 | 57 | 45 | 45 | 44 |
| Temperature coating medium [° C.] | 60 | 60 | 60 | 60 | 60 | 60 | 60 |

(Number of cycles: Number of method steps b), c), d) and X) performed, Number of phases: Number of combinations of several cycles with approximately the same parameters)

A phase is a combination of a plurality of cycles having approximately the same parameters, such as application quantity, distribution time and crystallization/drying time, wherein these phases can have build-up phases, main phases, smoothing phases and wax phases, each of which can comprise several cycles.

The exact sequence of the individual production cycles is shown in FIGS. 1, 2 and 3.

No rice starch isomalt composition was used in the preparation of the chewing gums of Trials 1 and 2. Instead, during the production of the chewing gum for Trials 1 and 2, powdered Isomalt ST PF was sprinkled on the coating layer in the initial coating cycle and in 9 subsequent coating cycles. Powdered rice starch was sprinkled on the coating layer (see FIG. 1) in cycles 11 to 15 and 27 to 36 of Trial 1 and in Trial 2 in cycles 11 to 20 and 22 to 31. Drying was performed at 35° C. for 30 minutes in the respective cycles 21 of Trials 1 and 2. In Trial 1, only one coating layer was applied in cycles 16 to 20 and 22 to 26 and 37 to 74, that is, no powdery composition was sprinkled on. In Trial 2, in cycles 32 to 55, only one coating layer, that is, no powdery composition, was applied.

Trials 3, 4 and 5 are trials according to the invention. In all three trials, a rice starch isomalt composition (1:1 mixture of Isomalt ST PF and rice starch) was sprinkled on the coating layer in the first ten cycles after the coating medium had been applied (see FIG. 2) (method steps b) and c)). A different number of coating layers was then applied in each case (method step X)) and a drying step (method step d)) was performed with a drying time of 30 min at 35° C. After the drying step, a plurality of subsequent coating cycles (method steps c)) were performed, followed by a plurality of applications of coating layers (method steps X)).

Trial 6 also represents a trial according to the invention, whereas Trial 7 is not according to the invention, since no drying step (method step d)) was performed therein. In both trials, a rice starch isomalt composition (1:1 mixture of Isomalt ST PF and rice starch) was sprinkled on the coating layer in the first ten cycles after the coating medium had been applied (see FIG. 3) (method steps b) and c)). Two coating layers were then applied (method steps X)). In Trial 6, a drying step (method step d)) was then performed at 35° C. for 30 minutes. 15 subsequent coating cycles (method step c)) were then performed and 17 coating layers were applied without sprinkling the rice starch-isomalt compositions (method step X)). In Trial 7, 15 subsequent coating cycles were performed immediately after the two coating layers had been applied, and 17 coating layers were then applied without sprinkling the rice starch isomalt composition.

The initial and subsequent coating cycles b) and c) and method steps X) were performed in Trials 1 to 7 at a temperature of 25° C. (temperature in the coating drum).

The confectionery products produced in Trials 1 to 7 were then examined photographically (see Tables 3 and 4). The brightness (L*) (lightness), the magenta/green value (a*), yellow/blue value (b*), chroma (C*) and the color value angle (chroma, h°) (hue angle) were analyzed (MINOLTA®, CMS, measuring field 3 mm, reflection).

The confectionery products according to Trial 1 were additionally coated with a layer of wax and measured in a further Trial 1a. In addition, the brightness of reference chewing gums of conventional type, which contain lightening colorants, was examined (reference 1 and reference 2).

TABLE 3

Photographic examinations of confectionery products

| | Trial 1 | Trial | Trial 2 | Trial | Trial 4 | Trial 5 | Trial 6 | Trial 7 | Reference 1 | Reference 2 |
|---|---|---|---|---|---|---|---|---|---|---|
| Brightness (L*) | 90.03 | 89.84 | 92.49 | 92.02 | 93.83 | 94.49 | 92.87 | 91.10 | 93.72 | 92.01 |
| Magenta/Green value (a*) | −0.45 | −0.63 | −0.48 | −0.62 | −0.59 | −1.93 | −0.49 | −0.73 | −1.53 | −1.54 |
| Yellow/Blue value (b*) | 2.85 | 3.34 | 0.35 | 3.68 | 2.58 | 1.67 | 2.74 | 4.08 | 0.67 | 5.33 |
| Chroma (C*) | 2.88 | 3.40 | 0.59 | 3.74 | 2.65 | 2.55 | 2.78 | 4.14 | 1.67 | 5.55 |
| Color value angle (h°) | 99.07 | 100.76 | 143.95 | 99.62 | 102.89 | 139.16 | 100.12 | 100.12 | 156.51 | 106.08 |

(measured without gloss component (filtered out), SCI, Reference 1: Wrigley chewing gum dragée with a coating covering comprising maltitol + TicaPAN; Reference 2: Wrigley chewing gum dragée with coating covering comprising isomalt + TiO$_2$, Trial 2: TiO$_2$ in coating covering)

TABLE 4

Photographic examinations of confectionery products

| | Trial 1 | Trial 1a | Trial 2 | Trial 3 | Trial 4 | Trial 5 | Trial 6 | Trial 7 | Reference 1 | Reference 2 |
|---|---|---|---|---|---|---|---|---|---|---|
| Brightness (L*) | 90.00 | 89.52 | 91.94 | 91.43 | 93.29 | 93.99 | 92.70 | 90.48 | 93.13 | 91.67 |
| Magenta/Green value (a*) | −0.49 | −0.67 | −0.51 | −0.66 | −0.63 | −1.98 | −0.52 | −0.77 | −1.58 | −1.59 |
| Yellow/Blue value (b*) | 2.90 | 3.42 | 0.43 | 3.78 | 2.68 | 1.77 | 2.82 | 4.17 | 0.75 | 5.44 |
| Chroma (C*) | 2.94 | 3.48 | 0.67 | 3.84 | 2.75 | 2.66 | 2.87 | 4.24 | 1.75 | 5.67 |
| Color value angle (h°) | 99.56 | 101.06 | 139.76 | 99.96 | 103.22 | 103.22 | 100.52 | 100.46 | 154.73 | 106.29 |

(measured with gloss component, SCE, Reference 1: Wrigley chewing gum dragée with a coating covering comprising maltitol + TicaPAN; Reference 2: Wrigley chewing gum dragée with coating covering comprising isomalt + TiO$_2$, Trial 2: TiO$_2$ in coating covering)

The data obtained in Tables 3 and 4 were obtained using a CM-5 spectrophotometer from MINOLTA® (3 mm measuring field, reflection). It can be seen from Tables 3 and 4 that the chewing gum dragées produced according to Trials 3 to 6 according to the invention are advantageously particularly light despite the absence of TICAPAN® (brightener) or $TiO_2$.

It can be seen that the chewing gums obtained in Trials 3, 4, 5 and 6 according to the invention have significantly better brightness values, particularly L* values, than the chewing gums from Trials 1 and 7 not according to the invention, which likewise did not contain any colorants, particularly no $TiO_2$. The $TiO_2$-containing chewing gum of the comparative trials, obtained in Trial 2 and Reference 2 and Reference 1 (TICAPAN®), have a higher brightness due to their TICAPAN® and $TiO_2$ content.

Example 2

In Trials 1 to 5, described below, five different confectionery products in the form of chewing gum, which have a sugar-free coating covering, were produced.

Black cores of the following composition were used in Trials 1 to 5:

16% chewing gum mass, soft, 16% chewing gum mass, hard, 25% Isomalt ST-PF, 28% Sorbitol P60 (Roquette), 10.50% Lycasin, 80/55, Roquette, 1.5% menthol Symrise, 1.5% peppermint oil, Symrise, 0.1% aspartame, Beneo, 0.1% acesulfame K, Beneo, 1% colorant SYMCOLOR® LBMFST No. 107564.

2.5 kg of uncoated cores were used per trial.

Trial 5 (with isomalt and without rice starch in powdery composition, with $TiO_2$) represents a control trial not according to the invention. The coating coverings for Trials 1 to 4 contained no colorants, particularly no $TiO_2$.

Table 5 below summarizes the compositions of the five chewing gums produced and the method parameters used for production.

The temperature during application in the initial and subsequent coating cycles b) and c) and in method steps X) was 25° C. (temperature in the coating drum).

TABLE 5

Compositions of the five chewing gums produced and the method parameters used for production

|  | Trial 1 | Trial 2 | Trial 3 | Trial 4 | Trial 5 |
|---|---|---|---|---|---|
| Mixing ratio in the coating powder (sprinkling) of isomalt to rice starch | 50:50 | 50:50 | 30:70 | 70:30 | 100:0 |
| Coating medium: Isomalt GS | 65.00% | 65.00% | 65.00% | 65.00% | 65.00% |
| Water (demineralized) | 34.40% | 34.40% | 34.40% | 34.40% | 33.90% |
| Sucrose Ester Sistema SP 50 | 0.50% | 0.50% | 0.50% | 0.50% | — |
| Aspartame/Acesulfame-K (1:1) | 0.10% | 0.10% | 0.10% | 0.10% | 0.10% |
| Titanium dioxide | — | — | — | — | 1.0% |
| Flavor (peppermint oil) [g] | 4 × 20 | — | — | — | — |
| Coating powder (sprinkling) [g] | 750 | 750 | 750 | 750 | — |
| Isomalt STPF (powder, sprinkle) [g] | — | — | — | — | 750 |
| Coating time [min] | 205 | 180 | 180 | 180 | 135 |
| Proportion of the coating covering | 35.8% | 32.9% | 31.4% | 31.4% | 36.2% |
| Number of drying steps | 2 (30 min each) | 3 (15 min each) | 3 (15 min each) | 3 (15 min each) | 0 |
| Number of phases/cycles | 6/46 | 5/42 | 5/42 | 5/42 | 4/42 |

Two method steps d) for drying were performed in Trial 1, using a temperature of 35° C. and for 30 minutes each. In Trials 2, 3 and 4, three method steps d) were performed for drying, wherein each of these method steps was performed using a temperature of 35° C. for 15 minutes each time. No method step d) was performed for drying in Trial 5.

The initial and subsequent coating cycles b) and c) and method steps X) were performed in Trials 1 to 5 at a temperature of 25° C. (temperature in the coating drum).

The exact sequence of the individual production cycles is shown in FIGS. 4, 5 and 6. The production of the chewing gum according to Trial 1 is according to the invention. In this trial, a powdered rice starch isomalt composition (50:50 mixture of Isomalt ST PF and rice starch) was sprinkled on the coating layer in the first ten cycles after the coating medium had been applied (see FIG. 4) (method steps b) and c)). Two coating layers were then applied (method step X)) and a drying step (method step d)) was performed at 35° C. for 30 minutes. After this drying step, 15 subsequent coating cycles (method step c)) were performed, followed by a further drying step (method step d)), performed at 35° C. for 30 minutes, followed by applying coating layers 17 times (method step X)). The weight ratio between the coating layer and rice starch isomalt composition in the coating covering of the chewing gum obtained in method step e) is 56:44 (coating layer:rice starch isomalt composition).

Trials 2, 3 and 4 are also trials according to the invention. In all three trials, a powdered rice starch isomalt composition having different ratios of isomalt ST PF to rice starch was sprinkled on the coating layer in the first five cycles after the coating medium had been applied (see FIG. 5) (method steps b) and c)). In Trial 2, the mixing ratio isomalt to rice starch in the coating powder when sprinkling was 50:50, in Trial 3, 30:70 and in Trial 4, 70:30. A drying step (method step d)) was carried out at 35° C. for 15 minutes after the coating medium had been applied. A rice starch isomalt composition having the above-mentioned variable mixing ratios was then sprinkled on in each case in five further cycles (method steps b) and c)). Two coating layers were then applied (method step X)) and a further drying step (method step d)) was performed at 35° C. for 15 minutes.

After this drying step, the coating medium having the above-mentioned powdered rice starch-isomalt compositions was applied 15 times each time (method step c)). After a third drying step (method step d)) at 35° C. for 15 minutes, twelve coating layers were applied in each case (method step X)). The weight ratio between the coating layer and rice starch isomalt composition in the coating covering of the chewing gum obtained in method step e) is 54:46 (coating layer:rice starch isomalt composition).

Trial 5 is not according to the invention, since only a powdered Isomalt ST PF-$TiO_2$ composition is used as coating powder and no drying step (method step d)) takes place during the production process. In Trial 5, a powdered isomalt-$TiO_2$ composition was applied in each case in the first 25 cycles after the coating medium had been applied. 17 coating layers were then applied. In the chewing gum obtained according to Trial 5, the weight ratio between the coating layer and the isomalt-$TiO_2$ composition is 54:46 (coating layer:isomalt-$TiO_2$ composition).

The confectionery products produced in Trials 1 to 5 were then examined photographically (see Table 6). The lightness, the magenta/green value, yellow/blue value, chroma and the hue angle were analyzed (MINOLTA® CM-5, measuring field 3 mm, reflection).

TABLE 6

Photographic examinations of confectionery products

| | Trial 1 | Trial 2 | Trial 3 | Trial 4 | Trial 5 |
|---|---|---|---|---|---|
| Brightness (L*) | 86.08 | 83.65 | 81.02 | 79.62 | 90.1 |
| Magenta/Green value (a*) | −0.7 | −0.69 | −0.32 | −0.81 | −1.28 |
| Yellow/Blue value (b*) | 0.37 | 0.53 | 0.49 | −0.5 | −1.73 |
| Chroma (C*) | 0.79 | 0.87 | 0.58 | 0.95 | 2.15 |
| Hue angle (h°) | 152.2 | 142.47 | 122.88 | 211.85 | 233.59 |

It can be seen that the products of Trials 1 to 4 according to the invention have an advantageous brightness, particularly brightness L*, despite the absence of $TiO_2$.

SEQUENCE LISTING

Not Applicable

The invention claimed is:

1. A method for the production of a confectionery product having a sugar-free coating covering, the method comprising:
   a) providing at least one confectionery core, an isomalt-containing coating medium and at least one powdered rice starch isomalt composition, the at least one powdered rice starch isomalt composition having at least 30% by weight of rice starch based on the total weight of the total dry substance of the at least one rice starch isomalt composition, and the at least one powdered rice starch isomalt composition consists of powdered rice starch and isomalt and does not contain gum arabic;
   b) performing an initial coating cycle comprising:
      b1) applying the isomalt-containing coating medium to the at least one confectionery core to obtain a coating layer enveloping the core;
      b2) sprinkling the at least one powdered rice starch isomalt composition onto the coating layer enveloping the at least one confectionery core to obtain a coating film; and
      b3) crystallizing the coating film obtained in method step b2) of the at least one confectionery core having at least one coating film;
   c) performing at least one subsequent coating cycle comprising:
      c1) applying the isomalt-containing coating medium to the at least one coating film to obtain at least one further coating layer enveloping the core;
      c2) sprinkling the at least one powdered rice starch isomalt composition onto the coating layer enveloping the at least one confectionery core to obtain a further coating film; and
      c3) crystallizing the coating film obtained in method step c2) of the at least one confectionery core having at least one coating film;
   X) performing at least one method step to obtain at least one further coating layer enveloping the core, wherein after method step b) and before method step e), the isomalt-containing coating medium is applied at least once to the at least one coating film to obtain at least one further coating layer enveloping the core without subsequent sprinkling of the at least one powdered rice starch isomalt composition onto the coating layer surrounding the at least one confectionery core;
   d) wherein at least one drying is performed at a temperature of 35 to 45° C. for 5 to 45 minutes; and wherein after the components used according to the process have been provided in method step a), method step b) is performed once, then method step c) is performed 2 to 15 times, then method step X) is performed 1 to 5 times, immediately afterwards method step d) is performed once, then method step c) is performed 1 to 20 times, wherein afterwards, method step X) is performed 1 to 30 times,
   and wherein the temperature used for the drying step d) is higher than the temperature used for the coating steps b) and c); and
   e) obtaining a confectionery product having a sugar-free coating covering.

2. The method according to claim 1, wherein the method is performed without the use of gum arabic and $TiO_2$ and a confectionery product which has a sugar-free, $TiO_2$-free and gum arabic-free coating covering is obtained.

3. The method according to claim 1, wherein the at least one confectionery core provided in method step a) is a sweet or a non-sweet confectionery core.

4. The method according to claim 1, wherein the confectionery core provided in method step a) is a chewing gum core and a chewing gum having a sugar-free coating covering is thus obtained in method step e).

5. The method according to claim 1, wherein the at least one powdered rice starch isomalt composition has 30 to 80% by weight rice starch (based on total dry substance of the at least one rice starch isomalt composition).

6. The method according to claim 1, wherein the at least one powdered rice starch isomalt composition has a rice starch to isomalt ratio of 30 to 70% by weight to 80 to 20% by weight (based on the total dry substance of rice starch and isomalt).

7. The method according to claim 1, wherein the proportion of the coating covering of the confectionery product is 20 to 60% by weight (based on the total mass of the confectionery product having a sugar-free coating covering).

8. The method according to claim 1, wherein the crystallization time in method step b3) and/or c3) is 2 to 10 minutes.

9. The method according to claim 1, wherein the temperature in method step b) and/or c) is 15 to 30° C.

10. The method according to claim 1, wherein method step c) is performed at least 10 times.

11. The method according to claim 1, wherein method step d) is performed 1 to 5 times after method step b) and/or c).

12. The method according to claim 1, wherein the drying according to method step d) after method step b) is performed after at least 5 performances of method step c).

* * * * *